M. E. TURNER.
ELECTRIC METER.
APPLICATION FILED APR. 6, 1908.

1,042,847.

Patented Oct. 29, 1912.

WITNESSES:
Brennan B. West.
Nathan F. Fretter.

INVENTOR,
Mathias E. Turner,
BY Bates, Fouts & Hull.
ATTYS.

M. E. TURNER.
ELECTRIC METER.
APPLICATION FILED APR. 6, 1908.

1,042,847.

Patented Oct. 29, 1912.
4 SHEETS—SHEET 2.

M. E. TURNER.
ELECTRIC METER.
APPLICATION FILED APR. 6, 1908.

1,042,847.

Patented Oct. 29, 1912.

UNITED STATES PATENT OFFICE.

MATHIAS E. TURNER, OF CLEVELAND HEIGHTS, OHIO.

ELECTRIC METER.

1,042,847.  Specification of Letters Patent.  Patented Oct. 29, 1912.

Application filed April 6, 1908. Serial No. 425,368.

*To all whom it may concern:*

Be it known that I, MATHIAS E. TURNER, a citizen of the United States, residing at Cleveland Heights, in the county of Cuyahoga and State of Ohio, have invented a certain new and useful Improvement in Electric Meters, of which the following is a full, clear, and exact description, reference being had to the accompanying drawings.

This invention relates to improvements in electric meters, and more particularly to an improvement, in the nature of an attachment to an integrating wattmeter, which may be applied to existing types of meters without the necessity for altering the construction and arrangement of such meters and with the addition thereto of a comparatively simple and economical construction which, when so applied, will enable the meter to indicate at the length of a month or other period between readings thereof the maximum amount of current or energy integrated per unit interval during such period. The amount of current integrated during any time interval is obviously equal to the average rate during such interval multiplied by the duration of the interval, although the rate of consumption may vary greatly during the course of that interval. The maximum indicator will, therefore, register either the number of electrical units actually integrated during that interval during which the demand was greatest, or the average rate during the same interval depending upon the calibration of the maximum scale; the difference being that in the former case the time element is computed in each instance, and in the latter case the time element is ignored from the fact of its being always the same. For ascertaining such maximum demand, I provide an indicating member and an actuating device therefor (which device is operated periodically for predetermined equal short intervals of time) with means having a driving engagement in one direction, said means comprising engaging members carried by said device and said indicating member, whereby said indicating member is driven forwardly upon the forward movement of said actuating device and left unmoved upon the reverse movement of said device, together with means for automatically returning the actuating device to its initial or zero position at the end of each such time interval. By this construction, the indicating member, after having been set to zero, will be moved a certain distance by the first operation of the actuating device corresponding to the total current integrated during such time interval. Should the total amount of current consumed during any of these predetermined short time intervals exceed the total amount consumed during any preceding time interval, then the indicator will be moved farther by the operation of the actuating device. The net result realized by this mode of operation is that the indicator at the time when the meter is read (say at the end of a month) will show the amount of current or energy actually integrated by the meter during that one of the equal time periods when the demand was at a maximum. For the purpose of automatically engaging and disengaging the indicator-actuating device with the current-driven shaft or member, I employ a shaft which is driven at a uniform rate of speed, as by a suitable clock-movement or other chronometric device, any suitable energy-storing device being employed for actuating the same. The uniformly rotating shaft is provided with means whereby the connection between the actuating device and the current-driven member or shaft will be automatically broken through the rotation thereof. I also provide means whereby the maximum current indicator may be set to zero when desired (as at the end of a month, when the meter is read); also means whereby the operation of the indicator-actuating device may be suspended during any desired interval of time.

Generally speaking, the invention may be defined as consisting of the combinations of elements embodied in the claims hereto annexed and illustrated, in two modifications, in the drawings forming part hereof, wherein—

Referring now by reference characters to the form of my invention shown in Figs. 1 to 6 inclusive, 1 denotes the rear portion of the casing of a wattmeter; 2 denotes the disk, which is revolved by the current in the usual manner.

3 denotes the permanent magnets between which the disk revolves, 4 the shoe, and 5 the worm shaft which is driven by said disk. This worm shaft meshes with the worm gear 6 on the shaft 7 (see Fig. 3), said shaft being provided at its front end with a finger 8 adapted to engage a rearwardly projecting finger 9, carried by an arm projecting from shaft 10. The latter shaft is journaled in plates 11 and 12 of the frame which supports the recording mechanism. Plate 11 is shown as triangular in outline, as in the standard type of wattmeter now in commercial use, and covers a portion only of plate 12, being suitably secured to said plate 12 by means of screws 13 and spacing sleeves 14. The shaft 10 is provided with a pinion meshing with the gear 15ª on the shaft 15, whose motion is in turn transmitted by means of a train of reduction gearing on shafts 16, 17 and 18 to the pointer on the units dial 19. Motion of shaft 18 is transmitted by means of reduction gearing to shaft 19ª, which carries a pointer for the next or tens dial 20, and so on, to shafts 21 and 22 which carry the pointers for the hundreds and thousands dials 23 and 24, respectively. Shaft 18 is journaled in plate 11 and the front plate 25 of the frame, while shafts 19ª, 21 and 22 are journaled in plates 12 and 25. The construction thus far described is that which is ordinary in wattmeters and, in its details, forms no part of my invention.

Figure 3:
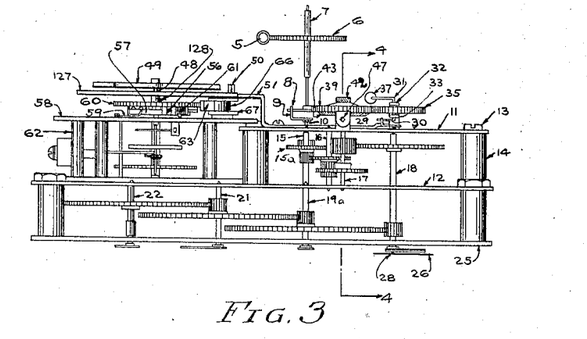
Fig. 3 represents a top plan view of the frame and attachment shown in Fig. 2, together with the worm gear and worm shaft by which the recording mechanism is driven.
Figures 4, 6:
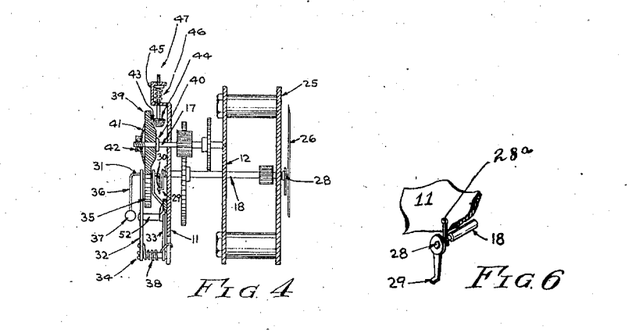
Fig. 4 represents a sectional view on the line 4—4 of Fig. 3.
Fig. 6 represents a sectional detail of the shafts for the units and current-demand indicators.
Figure 5:
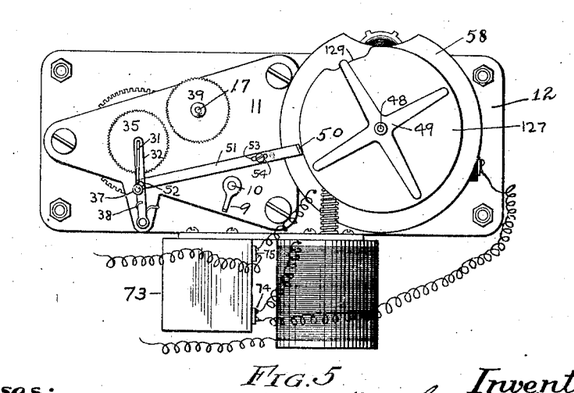
Fig. 5 represents a view, similar to Fig. 2, showing the cut-out for the maximum demand indicator.
Figure 7:
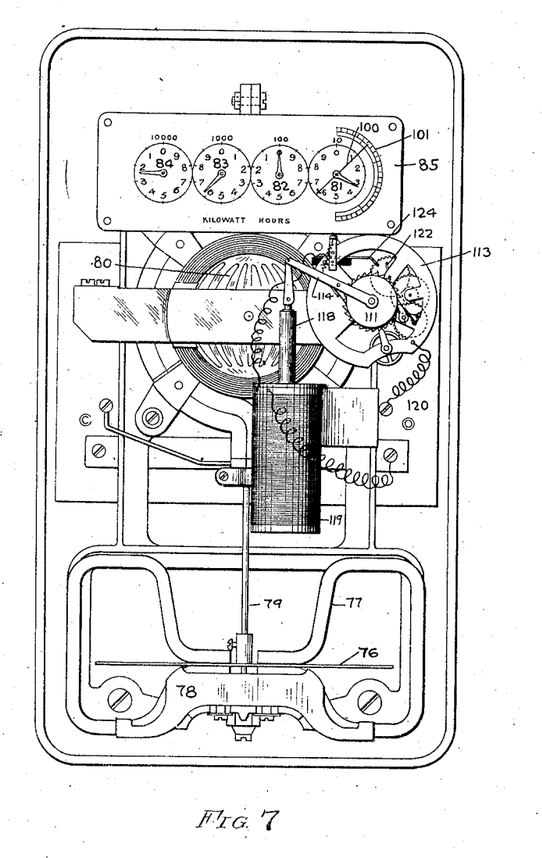
Fig. 7 represents a view, similar to Fig. 1, of another type of wattmeter having a modified form of my invention applied thereto.
Figures 8, 10:
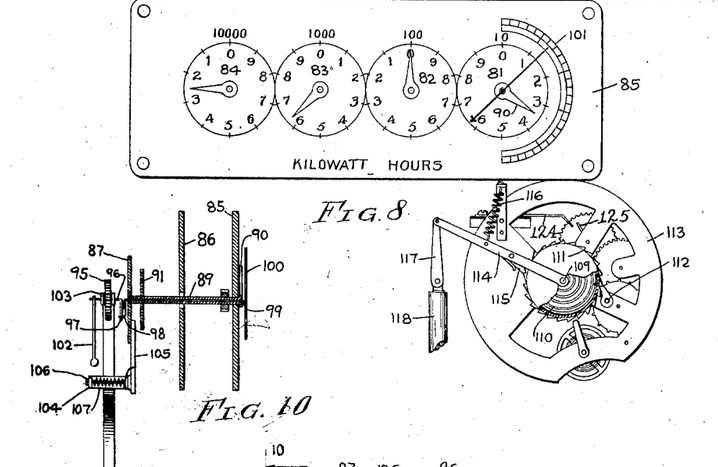
Fig. 8 represents a front plan view of the frame which carries the recording mechanism and showing a portion of my attachment.
Fig. 10 represents a sectional view on the line 10—10 of Fig. 9, one of the plates of the frame being broken away.
Figures 9, 11:
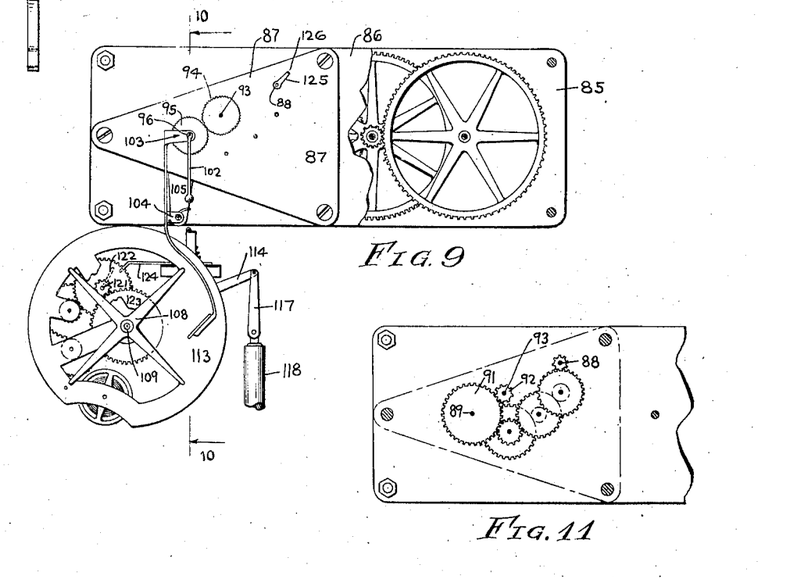
Fig. 9 represents a rear elevation of the mechanism shown in Fig. 8.
Fig. 11 represents a rear elevation of one end of the frame shown in Figs. 7 and 8, the rearmost plate being removed, and its position being indicated in dotted lines.

26 denotes an indicator, which coacts with a scale 27 to indicate the amount of current integrated during a predetermined time interval. Indicator 26 is mounted on a shaft 28 which is sleeved within shaft 18 and projects rearwardly therethrough and through the rear plate 11 of the frame, as shown in Figs. 3 and 6. This shaft is provided with a rearwardly projecting finger 29 which is adapted to be engaged by a finger 30 projecting from a short shaft 31 mounted between brackets 32 and 33 which are pivoted to the plate 11 by means of a shaft 34. Shaft 31 is provided with a gear 35, and the end of said shaft opposite finger 30 is bent downwardly to form an arm 36 having at the end thereof a weight 37. This arm is so arranged that, when the shaft 31 is free to turn under the influence of the weighted arm, it will set the shaft and gear to "zero" position; that is to say, to a position in which, if fingers 29 and 30 were in engagement, indicator 26 would be at zero.

38 denotes a spring which is coiled upon shaft 34 and engages the brackets 32 and 33, tending to move said brackets in a direction to bring the gear 35 into mesh with the gear 39, which is frictionally mounted upon the shaft 17 extending between and journaled in plates 11 and 12. For the purpose of causing shaft 17 to rotate gear 39 by friction, I provide such shaft with a collar 40 against which one face of said gear may bind and force said face against said collar by means of a spring disk 41 and a nut 42 applied to the shaft on the opposite side of the gear from collar 40. The front face of gear 39 (that is to say, the face toward the front of the frame) is provided with a bevel gear 43, which is adapted to be engaged by a bevel pinion 44 supported from a bracket 45 provided at the top of frame plate 11. Pinion 44 is normally held out of engagement with bevel gear 43 by means of a spring 46, and the upper end of the pinion shaft is squared, as shown at 47, for the reception of a key, which may be inserted into a suitable recess or aperture in the meter casing and by depressing which pinion 44 may be brought into mesh with the gear 43, after which it may be rotated so as to turn gears 39 and 35 in a direction to reset the maximum pointer. Owing to the fact that the only connection between the gear 35 and the maximum pointer 26 is through the fingers 29 and 30, and to the fact that it is necessary that the finger 30 be always in the rear of the finger 29 so that the forward motion of the gear 35 may serve to advance the pointer, the direction of the motion necessary to reset the pointer will always be forward. The gear 35 will be rotated so as to bring the finger 30 behind the finger 29 and rotate the pointer 26 in a forward direction until the zero point is reached. The resetting motion is therefore of exactly the same nature as the maximum indicating motion with the exception that in the resetting movement the maximum hand is moved forwardly so as to complete its revolution and be left at the zero point.

With the parts arranged as described thus far, it will be seen that gears 35 and 39 will be held in mesh or in engagement by means of the spring 38. It will be apparent that, if this engagement between the gears be broken, the shaft 31 and its gear 35 will be set to zero by means of the weighted arm 36. For the purpose of enabling the indicator to register the current integrated during that one of a number of equal short intervals of time at which the demand was greatest, I provide means whereby the engagement between gears 35 and 39 may be broken periodically at equal, short time-intervals, to enable shaft 31 and gear 35 thereon to be set to zero position at the end of such time intervals. For the purpose of so breaking the engagement I provide time mechanism comprising a continuously rotating shaft having means for periodically moving gear 35 away from gear 39 at equal short intervals of time.

48 denotes the continuously rotating shaft which is provided at its inner end with a star wheel 49. In the construction illustrated herein, shaft 48 will be rotated once an hour and star wheel 49 is provided with four arms. These arms are of such length as to engage at their outer ends the inclined end 50 of a link 51, which is pivotally connected at its opposite end to a stud 52 connecting bracket arms 32 and 33. This link is provided with an elongated slot 53 for the reception of a pin 54 secured to plate 11. With the construction described, it will be apparent that, for every revolution of shaft 48, link 51 will be moved longitudinally four times, each time carrying gear 35 out of engagement with gear 39 and enabling shaft 31 and gear 35 to be set to zero a corresponding number of times. As soon as an arm of the star wheel disengages the end 50, spring 38 returns link 51 and gear 35 to the positions shown in Fig. 2. Should the current consumption during any of these short intervals of time exceed that for any preceding interval, finger 30 will engage finger 29 and advance shaft 28 and indicator 26 correspondingly.

For simplicity and economy of construction, I prefer to employ a small and simple clock mechanism for breaking the engagement between gears 35 and 39 and to use with such mechanism an automatic winding device which will keep the spring, by which shaft 48 is rotated, under constant tension. The spring 55 is mounted within a drum 56 which is provided on its exterior with ratchet teeth. One end of the spring is secured to the drum and the other to shaft 48. 57 denotes a pawl carried by the plate 58 and provided with a spring 59 tending to hold the same in engagement with the ratchet on the drum 56.

60 denotes a pinion which is loose upon shaft 48 and is provided with a pawl 61 adapted to engage the ratchet on drum 56. Plate 58, which forms a journal for shaft 48, is supported from plate 12 by means of suitable studs and spacing sleeves 62. The pinion 60 is operated automatically and periodically by means of a rack 63 carried by the core 64 of a solenoid having a winding 65, said rack being held in engagement with said pinion by means of a roller 66 having flanges 67 between which the rack is embraced. A spring 68 is interposed between a collar 69 on the core and the plate 70 which supports the solenoid 65. This plate is carried by the bottom of plate 12 and projects rearwardly therefrom. One of the terminals of the winding 65 is electrically connected with a rotary contact 71 carried by a shaft and the other terminal is connected to a fixed contact 72. The shaft which carries contact 71 is a shaft which is driven at a greater rate of speed than shaft 48, preferably making eight revolutions to one revolution of the latter shaft. With this arrangement, it follows that the solenoid will be energized every seven-and-a-half minutes, or twice for every operation of link 51 by an arm of the star wheel 49. The result is that spring 55 is automatically wound at predetermined short intervals of time. The throw of rack 63 is such that the pinion 60 operated thereby tends to gain somewhat on the spring, with the result that the spring is kept under substantially constant tension and the rotation of shaft 48 is exceedingly uniform. The strength of the solenoid will be so proportioned to the strength of the spring as not to wind the latter too tightly.

Figure 1:
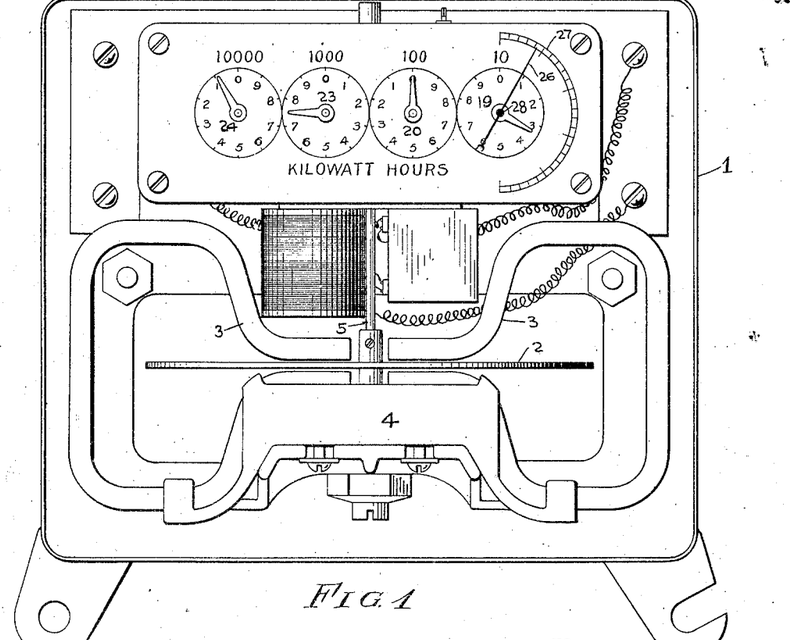
Figure 1 represents a front elevation of a wattmeter having my invention applied thereto, the cover having been removed.
Figure 2:
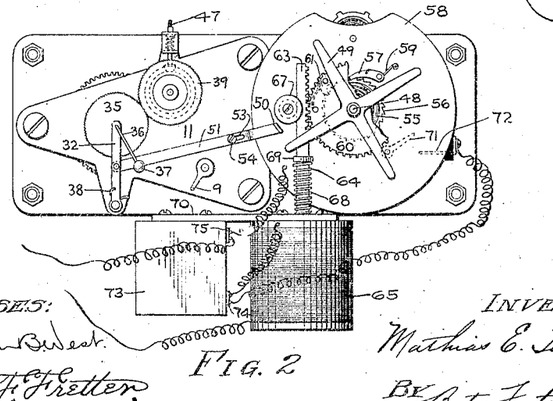
Fig. 2 represents a rear elevation of the frame which supports the recording mechanism, showing the manner in which my attachment is applied to said frame, the cut-out for the actuating device being omitted for clearness of illustration.

For the purpose of preventing sparking between the contacts 71 and 72, I provide a condenser 73 which may be conveniently carried by plate 70 and connect the terminals 74 and 75 to the winding coil 65 and to one of the meter terminals and to contacts 71 and 72, in the manner shown in Fig. 2. By this arrangement, on breaking the contacts, the current is discharged into the condenser instead of arcing between the contacts.

For the purpose of preventing shaft 28 from being carried around by the rotation of shaft 18, I provide a spring 28ª attached to plate 11 and bearing frictionally against shaft 28 with sufficient force to prevent such action but not interfere with the rotation of shaft 18 by the shaft 31, (see Fig. 6).

In Figs. 7 to 11 inclusive there is illustrated a modification of the attachment shown in the preceding figures. In the latter figures, 76 denotes the rotary disk of a wattmeter of a somewhat different type from that illustrated in Fig. 1; 77 denotes the permanent magnet, and 78 the shoe. 79 denotes a worm shaft connected with disk 76 and with an armature 80. This meter is provided with a frame, similar to that shown in the preceding figures, which carries the recording mechanism and is provided with dials 81, 82, 83 and 84, similar to the dials shown in the preceding figures. The frame comprises a pair of parallel plates 85 and 86 which are substantially coextensive and a triangular plate 87, similar to plate 11. Movement of the wattmeter drive shaft is transmitted to shaft 88 and, through a train of reduction gears, from said shaft 88 to shaft 89, which carries the pointer 90 for the units dial 81. Shaft 89 is provided with a gear 91 meshing with a pinion 92 on shaft 93, and shaft 93 is provided, at the rear of plate 87, with a gear 94 adapted to mesh with or engage a gear 95 mounted on a short shaft 96 which is provided at one end thereof with an arm 97 adapted to engage the rearwardly projecting finger 98 of a shaft 99 which is mounted within shaft 89 and carries the maximum-demand indicator 100. This indicator coöperates with a scale 101. At the end opposite arm 97, shaft 96 is provided with a weighted arm 102 which, when gear 95 is out of engagement with gear 94, will automatically set shaft 96 and gear 95 thereon to zero position. As is the case with the form of my invention disclosed in Figs. 1 to 6 inclusive, I mount shaft 96 in such manner that the engagement between gears 94 and 95 may be broken and automatically break the engagement between said gears at predetermined equal time intervals, thus enabling the gear 95 and shaft 96 to be set to zero. Shaft 96 is pivoted between the arms or brackets 103 of a frame, said frame being provided intermediate of its ends with a pair of arms or brackets 104 pivotally supported on a plate 105 depending from plate 87, by means of a short shaft 106 passing through said arms and having thereon a spring 107, one end of which is connected to plate 105 and tends to hold gears 94 and 95 in engagement. The lower end of the gear-carrying frame projects down into the path of movement of the arms of a star wheel 108 carried by a shaft 109 of a time mechanism. As in the preceding species of my invention, this shaft is designed to make a complete rotation once every hour, whereby engagement between gears 94 and 95 is broken at fifteen-minute intervals and shaft 96 and gear 95 are automatically set to zero. For the purpose of winding the spring 110 of said shaft, I provide a drum 111 having ratchet teeth on its periphery and connect one end of the spring to the drum and the other end to shaft 109. 112 denotes a detent pawl carried by the frame 113 which prevents the retraction of the drum by the spring. 114 denotes an arm which is sleeved on shaft 109 and is provided with a pawl 115 adapted to engage the ratchet teeth on the drum. 116 denotes a spring connected at one end to arm 114 and at its other end to a bracket carried by frame 113. At its outer end, arm 114 is connected to a link 117, the lower end of which is pivotally connected to a core 118 of a solenoid, the winding of which is shown at 119. One terminal of winding 119 is connected to the plate 120, which in turn is connected to the clock-work frame 113, said frame supporting a shaft 121 provided with a contact finger 122, said shaft being driven by means of a gear 123 on shaft 109. The other terminal of winding 119 is connected with a second contact finger 124, which is insulated from frame 113. As in the preceding embodiment of my invention, the shaft which carries the rotary contact is driven at a greater rate of speed than the shaft which carries the star wheel, the proportion of about eight-to-one being preferred. When contacts 122 and 124 are in engagement, the solenoid is energized, the core 118 is drawn downwardly and rotates the spring drum 111. As in the preceding embodiment of my invention, the parts will be so proportioned that the solenoid will tend to wind the spring 110 faster than it is slackened by the rotation of shaft 109, with the result that said spring will be kept under substantially uniform tension and will produce a corresponding uniform rotation of shaft 109. Shaft 88 is driven from the meter by means of an arm 125 having a rearwardly projecting finger 126 thereon.

In both of the embodiments of my invention herein disclosed, there are provided means whereby the meter will indicate, at the end of a month or other period between readings thereof, the maximum of the average current demands or consumptions for predetermined short equal intervals of time during such period. In both forms of my invention, means are provided for periodically bringing into operative relation with each other a current actuated member (gear 39 and gear 94) and an indicator actuating device (gear 35 with its shaft 31 and gear 95 with its shaft 96) and for thereafter automatically separating said member and said device.

For convenience of description the word "gear" is employed to describe the members 35, 39, 94 and 95. It will be understood that I do not propose, by the use of this term, to limit my invention to gears of the type shown, as friction gears for instance might be employed for the purpose of connecting the indicator-actuating shaft with the current-driven shaft or member without avoiding the spirit of my invention. Furthermore, by the terms "current-actuated member" and "current-driven shaft" I do not mean to be limited to any particular member or shaft in the train of elements which are driven by the current supplied to the meter. While I have shown and described clock mechanism which is provided with automatically operating winding mechanism, I do not propose to be limited to such clock mechanism, as it will be obvious that, for many of the purposes of my invention, hand-wound clock mechanism may be employed.

By the construction illustrated and described, I have produced an attachment which may be applied to the frame and recording mechanism of a standard watt-meter without the necessity of making any alteration in the frame and with practically no change whatever in such recording mechanism, and which may be assembled, with such frame, in such wattmeters without any alterations in the construction and mechanism of the latter.

Under certain conditions, it may be desirable to have the maximum demand indicator operated only during certain times of the day, as for instance, between the hours from 2 to 5 in the afternoon. To perform this action without interfering with the regular operation of the recording mechanism, I provide a cam 127, which may be mounted on an hour shaft 128 which will make a complete rotation every 24 hours. This cam is preferably circular in outline and its radius is slightly greater than the length of the arms of the star wheel 49. It is provided, however, with a recess 129 beyond the inner periphery of which the arms of the star wheel project. This cam is arranged to engage the end of the link 51 and thereby hold gears 35 and 39 out of engagement except during the period that recess 129 is in operative relation to such end. During this time, spring 38 can bring gears 35 and 39 into engagement and the operation of the indicating member will be as described hereinbefore.

My rewinding device is operated by current supplied to the meter, making it unnecessary to provide dry cells and promoting such compactness in my attachment as will enable it to be applied to existing meters with practically no alteration therein. The fact that the breaking of the connection between the indicator actuating device and the current driven wheel or shaft is accomplished mechanically contributes further to this same result. Furthermore, the winding arrangement by which the spring which actuates the shafts 48 and 109 is kept under constant tension is particularly useful in connection with a device of this character, as it insures a constant rate of rotation in the shaft by means of which the indicator is periodically operated. This prevents any fluctuation in the time intervals that said indicator is operated,—a desideratum of the utmost importance in securing accuracy of results.

Having thus described my invention, I claim:

1. The combination, with a meter having a dial plate and a gear train in the rear of said dial plate, a maximum indicator comprising a shaft extending through said dial plate, a pointer carried by the forward end of said shaft, a rotatable gear mounted in the rear of said dial plate, driving connections between said gear and said shaft whereby said shaft will be rotated when said gear revolves in a forward direction and will be left stationary when said gear rotates rearwardly, a gear operated by the meter train and adapted to rotate said first gear in a forward direction, means for separating said gears at predetermined time-intervals, and means operative during such separation to set said first gear to zero position.

2. The combination with a meter having a dial plate and a gear train in the rear of said dial plate, of a maximum demand indicator comprising a shaft extending through said dial plate, a maximum demand pointer secured to the forward end of said shaft, a turning member at the rear end of said shaft, a gear mounted beyond the inner end of said shaft and normally having its axis substantially coincident therewith, means rotatable with said gear and adapted to engage said turning member when the indicating pointer is at zero position, a second gear connected with the meter train and adapted to rotate said first gear in a forward direction, said turning member and said means being so arranged as to rotate said shaft forwardly when said gear is rotated forwardly, means for separating said gears at predetermined time intervals, and means operative during such separation to set said first gear to zero position.

3. A maximum demand indicator adapted to be applied to existing electric meters, said indicator comprising, in combination, a shaft carrying an indicating device at its forward end, a gear adapted to drive said shaft when rotated in a forward direction and to become operatively disconnected from said shaft when driven in the reverse direction, a current-driven gear adapted to rotate said first gear in a forward direction, means for separating said gears at predetermined time intervals, means operative during such separation to set said first gear to zero position, and means operative from the outside of the meter casing for moving both said indicating device and said first gear to zero position.

4. A maximum demand indicator adapted to be applied to existing electric meters, said indicator comprising, in combination, a shaft carrying an indicating device at its forward end, a gear having means tending to retain it at zero position and to engage said shaft when the indicating device carried thereby is at zero position, and to drive said shaft when driven forward from zero position but to release said shaft when driven reversely, a current driven gear adapted to rotate said first gear in a forward direction, means for separating said gears at predetermined time intervals to allow said shaft engaging gear to return to zero position, and means operative from the outside of the meter casing for moving both said indicating device and said shaft engaging gear to zero position.

5. In an electric meter, in combination, a shaft having an indicating device, a driving arm carried by said shaft, a current driven gear, a gear provided with means for engaging said driving arm and rotating said shaft in one direction, and adapted to mesh with said current driven gear, means for shifting said second gear out of engagement with said current driven gear at predetermined time intervals, and means operative during such separation to set said second gear to zero position.

6. In an electric meter, in combination, a shaft provided with an indicating device, a driving arm carried by said shaft, a current driven gear, a gear provided with means for engaging said driving arm when said indicating device and said second gear are both in zero position and adapted to drive said shaft when driven forward from such position and to become disengaged from said shaft when rotated reversely, and adapted to mesh with said current driven gear, means for shifting said gear out of engagement with said current driven gear at predetermined time intervals, and means operative during such separation to set said second gear to zero position.

7. In an electric meter, in combination, a shaft having an indicating device, a driving arm carried by said shaft, a current driven gear, a gear provided with means for engaging said driving arm and rotating said shaft in one direction, and adapted to mesh with said current driven gear, means for shifting said second gear out of engagement with said current driven gear at predetermined time intervals, means automatically operative during such separation to set said second gear to zero position, and means for manually operating said current driven gear to move said indicating device and said second gear to zero position without changing their relative positions.

8. In a meter, an indicating member, a gear adapted to drive said indicating member when rotated in a forward direction and to become disengaged therefrom when rotated in a reverse direction, a current driven gear adapted to drive said first gear in a forward direction, means for operatively disengaging said gears from each other at predetermined time intervals, means operative during such separation to set said second gear to zero position, and means for rotating said second gear forwardly to set the same and with it the indicating device simultaneously to zero position.

9. In an electric meter, the combination of an indicating member, an actuating device therefor, a current-driven shaft having a gear frictionally mounted thereon, engaging members carried by said device and said indicating member whereby said indicating member is driven forwardly upon the forward movement of said actuating device and left unmoved upon the reverse movement of said device, means for automatically separating said gear and said actuating device at predetermined time intervals, and a gear movable into and out of engagement with the former gear and adapted, when in engagement therewith, to rotate the same and thereby set the actuating device and the indicating member to zero position, substantially as specified.

10. In an electric meter, the combination of an indicating member, a rotatable shaft, engaging members carried by said indicating member and said shaft whereby said indicating member is driven forwardly upon the rotation of said shaft in one direction and left unmoved upon the rotation of said shaft in the reverse direction, a gear on said shaft, a current-driven shaft, a gear mounted on the latter shaft and frictionally engaging the same and adapted to engage the former gear, and means normally out of engagement with the latter gear but adapted to be moved into engagement therewith to rotate the same and the first mentioned gear and thereby set the indicating member and its rotatable shaft to zero, substantially as specified.

11. In an electric meter, the combination of an indicating member, a shaft therefor, a gear for rotating said shaft, a second shaft, a gear frictionally mounted on said second shaft and engaging the former gear peripherally, means for disengaging said gears at predetermined time intervals, means for setting back said former gear during such disengagement, the latter gear having a bevel gear on one face thereof, a bevel pinion adapted to engage the bevel gear, and means tending to hold said pinion and gear out of engagement, substantially as specified.

12. In an electric meter, the combination of an indicating member having a shaft, a rotatable shaft, engaging members carried by said shafts whereby the former shaft will be rotated forwardly upon the rotation of said last mentioned shaft in one direction and left unmoved upon the rotation of said last mentioned shaft in the reverse direction, a gear on said last mentioned shaft, a current driven shaft, a gear frictionally mounted thereon and adapted to engage peripherally the former gear, means for disengaging said gears at predetermined time intervals, means for setting back said former gear during such disengagement, the latter gear being provided on one face thereof with a bevel gear, a bevel pinion, a shaft therefor, and a spring applied to said shaft and normally holding said bevel pinion out of engagement with said bevel gear, substantially as specified.

13. In an electric meter, the combination of an indicating member a gear adapted to advance said member when rotated forwardly and to become disconnected therefrom when rotated reversely, a current driven shaft, a gear frictionally mounted on said shaft and adapted to drive said first gear forwardly, means for operatively disconnecting said gears at predetermined time intervals, means operative during such disconnection to set back said first gear to its zero position, a bevel gear connected with said second gear, a bevel pinion adapted to engage said bevel gear, and means tending to hold said pinion and gear out of engagement.

14. In an electric meter, the combination, with a dial plate, of an indicating member in front of said dial plate, a shaft connected to said indicating member and extending through said dial plate and provided with an operating member at the rear of said dial plate, a second shaft normally in substantial alinement with said first shaft and having a gear thereon and provided with a member adapted to engage the operating member of the former shaft, means tending to return said second shaft to a predetermined position when displaced from such position, a current-driven shaft having a gear thereon adapted to engage with the former gear, and means for automatically separating said gears at predetermined time intervals, substantially as specified.

15. In an electric meter, the combination of an indicating member, a shaft therefor having a projection, a second shaft normally in substantial alinement with said first shaft and having a projection adapted to engage the projection on the former shaft, a gear on said second shaft, means tending to hold the second shaft and the gear in zero position, a current-driven shaft, a gear thereon adapted to engage the former gear, and time mechanism arranged to automatically move said second shaft out of a linement with said first shaft at predetermined intervals to separate said gears, substantially as specified.

16. In an electric meter, the combination of a frame having a dial plate, a shaft supported by said frame and extending through said dial plate, a maximum-demand indicator rigidly secured to said shaft in front of said dial plate, a second shaft supported by said frame, a gear thereon, engaging members carried by said shafts whereby said first shaft will be rotated forwardly when said second shaft is rotated in one direction and will be left unmoved upon the rotation of said second shaft in the reverse direction, a third shaft supported by said frame, a gear thereon arranged to mesh with the first mentioned gear, a plate carried by said frame, clockwork mechanism carried by said plate, connections driven by said mechanism for automatically separating said gears at predetermined equal time intervals, and means for automatically setting the first mentioned shaft to initial or zero position during such separation.

17. In an electric meter, the combination of a frame having a dial plate, a shaft supported by said frame and extending through said dial plate, a maximum demand indicator carried by said shaft in front of said dial plate, a second shaft supported by said frame, a gear thereon, connecting members carried by said shaft arranged to engage each other when both shafts are in zero position whereby said first shaft will be driven when said second shaft is rotated forwardly from zero position and will be left stationary when said second shaft is driven reversely, a third shaft supported by said frame, a gear thereon arranged to mesh with the first mentioned gear, a plate carried by said frame, clockwork mechanism carried by said plate, connections driven by said mechanism for automatically separating said gears at predetermined equal time intervals, electrically operated automatic rewinding mechanism for said clockwork, and means for automatically setting the first mentioned shaft to initial, or zero, position during such separation.

18. In an electric meter, the combination of a front and a rear plate, a maximum-demand indicator in front of the front plate, a shaft therefor projecting through the rear plate, an actuating device operatively supported from the rear plate and adapted to engage the said shaft, means tending to automatically set the actuating device to initial or zero position, a plate detachably secured to the rear plate of said frame, mechanism carried by the latter plate for automatically breaking the connection between the driven member and the actuating device at equal time intervals, and means carried by the last mentioned plate for automatically suspending the operation of said mechanism for a predetermined interval of time.

19. The combination, with an electricity meter having a rotating spindle and counting mechanism driven from such spindle, said counting mechanism comprising three parallel spaced plates, shafts journaled in said plates, intermeshing gear wheels carried by said shafts, and pointers secured to certain of said shafts and overlying the forward side of the first plate, said first plate being also provided with dial graduations, of a maximum indicator shaft traversing all three of said plates, a maximum demand indicator carried by said maximum indicator shaft in front of the dial plate, an angularly movable body carried by the innermost plate substantially in line with said maximum indicator shaft, engaging members carried by said body and said maximum indicator shaft whereby said shaft will be rotated forwardly upon the forward movement of said body and left unmoved upon the reverse movement of said body, a second body carried by said third plate and arranged in constant driving relation with the meter spindle, said second body being normally in driving contact with said first body, clock mechanism mounted in the rear of the second plate and at the end of the rearmost plate, connections between said clock mechanism and said bodies whereby said bodies will be disengaged from each other at predetermined intervals of time, and means for returning said first body to a predetermined position during such disengagement.

20. In an electric meter, the combination of a current driven shaft, a pair of spaced plates, dials carried by one of said plates, pointer shafts journaled in said plates, a third plate detachably secured to the rear plate of the said pair of plates, a hollow shaft journaled in the front and rearmost plates and extending through the intermediate plate and having a pointer thereon, reduction gearing connecting said shaft and the other pointer shafts, a series of shafts journaled in the second and third plates, gearing connecting one end of the shaft series with the opposite end, a driving connection between the first shaft of the series and the current driven shaft, a driving connection between the last shaft of this series and the hollow shaft, and a shaft mounted in the hollow shaft and provided in front of the dial plate with a pointer, said last mentioned shaft and said current driven shaft being detachably connected in driving relation.

21. In an electric meter, the combination of a dial plate, a current driven shaft, a series of shafts each projecting through the dial plate and each having a pointer, reduction gearing interposed between the current driven shaft and the first shaft of the series, a shaft journaled within the first shaft of said series and having a pointer, an actuating device for the last mentioned shaft, engaging members carried by said device and said last mentioned shaft whereby said shaft is driven forwardly upon the movement of said actuating device in one direction and left unmoved upon the movement of said actuating device in the reverse direction, said current driven shaft and said actuating device being detachably connected in driving relation, and means for returning the actuating device to initial or zero position.

22. In a meter, in combination, a frame, a shaft carried by said frame and having an indicating member and a driving arm, a bracket pivoted to said frame, a shaft carried by said bracket and having a driving member adapted to engage said driving arm, means tending to move said shaft to zero position, a gear on said second shaft, a current driven gear adapted to peripherally engage said first gear, and means for moving said bracket about its pivot at predetermined time intervals to disengage said gears and permit said second shaft to return to zero position.

23. In a meter, in combination, a frame, a shaft carried by said frame and having an indicating member and a driving arm, a bracket pivoted to said frame, a shaft carried by said bracket, means normally holding said bracket in such position that said shafts shall be in substantial alinement, a driving member carried by said second shaft and adapted to engage said driving arm when said second shaft and said indicating member are both in zero position and to move said indicator when said second shaft is forwardly rotated, means yieldingly retaining said second shaft in zero position, a gear on said second shaft, a current driven gear carried by said frame and normally adapted to peripherally engage said first gear, and means for moving said bracket about its pivot at predetermined time intervals to disengage said gears and permit said second shaft to return to zero position.

24. In an electric meter, in combination, a dial plate, having a plurality of dials thereon adapted to indicate electrical consumption, pointers for said dials, shafts for actuating said pointers and means for driving said shafts, one of said shafts being hollow, a maximum demand dial concentric with said hollow shaft and additional to the consumption dial, a maximum demand shaft projecting through said hollow shaft, a pointer carried thereby and coöperating with said maximum demand dial, means for rotating said shaft in one direction, means for intermittently connecting and disconnecting said rotating means with said driving means at predetermined time intervals, and means for setting said rotating means back to zero during the intervals of its disconnection from the driving means.

25. In an electric meter, in combination, a dial plate having a plurality of dials thereon adapted to indicate electrical consumption, pointers for said dials, shafts for actuating said pointers and means for driving said shafts, one of said shafts being hollow, a maximum demand dial concentric with said hollow shaft and additional to the consumption dial, a maximum demand shaft projecting through said hollow shaft, a pointer carried thereby and coöperating with said maximum demand dial, rotating means having a lost-motion, one-way, driving connection with said maximum demand shaft whereby the same may be driven in one direction, driving means advanced at a speed proportional to the speed of said pointer shafts, mechanism for intermittently connecting said rotating means to said driving means and for disconnecting the same therefrom at predetermined time intervals, means for setting said rotating means back to predetermined position during the intervals of its disconnection from the driving means, and means for the maximum demand shaft from turning with said hollow shaft.

26. In an electric meter, in combination, a frame, a bracket pivoted thereto, a gear wheel carried by said bracket and adapted to directly engage and advance a maximum demand indicator, a current driven gear adapted to peripherally engage said first gear, yielding means tending to hold said gears in contact with each other, a constant speed shaft carried by said frame, a wheel carried by said shaft and having arms, an operating rod connected to said bracket and adapted to be engaged by said arms to move said bracket about said pivot at predetermined time intervals and disconnect said gears from each other, and means for setting said first gear back to zero position during such disengagement.

27. In an electric meter, in combination, a frame, a bracket pivoted thereto, a gear wheel carried by said bracket and adapted to directly engage and advance a maximum demand indicator, a current driven gear adapted to peripherally engage said first gear, yielding means tending to hold said gears in contact with each other, a constant speed shaft carried by said frame, means carried by said shaft for swinging said bracket at predetermined time intervals to disengage said gears, and means for setting said first gear back to zero during such disengagement.

28. In an electric meter, in combination, a frame, a bracket pivoted thereto, a gear wheel carried by said bracket and adapted to directly engage and advance a maximum demand indicator, a current driven gear adapted to peripherally engage said first gear, yielding means tending to hold said gears in contact with each other, a constant speed shaft carried by said frame, a circular disk concentric with said shaft and driven thereby but at a slower rate, and adapted to engage said arm to hold said bracket with said gears disengaged, and having a notch adapted to receive said rod to allow the bracket to swing into engaged position, a second wheel mounted on said shaft and having arms adapted to engage said rod to swing said bracket and disengage said gears at predetermined time intervals, and means for setting said first gear back to zero position during such disengagement.

29. In an electric meter, the combination, with a meter spindle and a driving gear rotated at a speed directly proportional thereto, of an indicating member, a bracket movably connected to the meter frame, a driven gear journaled in said bracket, a cam carried by the meter frame, mechanical means connected to said bracket and governed by the rotation of said cam for periodically shifting said bracket so as to bring said gears into engagement and maintain them in engagement for a predetermined interval of time, a one-way, lost-motion, driving connection between said driven gear and said indicating member whereby said indicating member will be driven forward from its zero position as said driven gear is rotated forwardly, means for returning said driven gear to its initial position in the intervals of its disconnection from said driving gear, a second member carried by said meter, means for driving said cam and second member at different constant speeds, the speed of said cam being preferably greater than that of the second member, and cam means carried by said second member and arranged to prevent the shifting of said bracket in a direction to engage said gears in driving relation during a predetermined portion of the rotation period of said second member.

30. In an electric meter, the combination, with a rotating member whose speed at every instant is dependent upon the rate of consumption of electricity or energy, of an indicating device, a driving body for said indicating device, a one-way, lost-motion driving connection between said body and said indicating device, a pair of cams carried by the meter, means for revolving said cams at different speeds, means governed by one of said cams for periodically connecting said rotating member and driving body in driving relation and maintaining them in such relation for a predetermined interval of time, and means for returning said body to its initial position in the intervals of its disconnection from said rotating member, the other of said cams being arranged to prevent the establishment of driving connections between said rotating member and said body during a part of the revolution period of said second cam.

In testimony whereof, I hereunto affix my signature in the presence of two witnesses.

MATHIAS E. TURNER.

Witnesses:
J. B. HULL,
P. L. COBB.